US005790360A

United States Patent [19]
Ryan

[11] Patent Number: 5,790,360
[45] Date of Patent: Aug. 4, 1998

[54] POWER SURGE SUPRESSION SYSTEM WITH MULTI-LEVEL STATUS ANNUNCIATION CIRCUITRY

[75] Inventor: Barry D. Ryan, Coeur d'Alene, Id.

[73] Assignee: A.C. Data Systems of Idaho, Inc., Coeur d'Alene, Id.

[21] Appl. No.: 688,327

[22] Filed: Jul. 30, 1996

[51] Int. Cl.⁶ .................................................. H02H 7/00
[52] U.S. Cl. ............................ 361/111; 361/56; 361/115; 361/118
[58] Field of Search .............................. 361/56, 91, 111, 361/118, 115, 127

[56] References Cited

U.S. PATENT DOCUMENTS

| | | | |
|---|---|---|---|
| D. 108,646 | 3/1938 | Lavallee | 361/118 |
| D. 271,297 | 11/1983 | Jonsson | D13/158 |
| D. 290,836 | 7/1987 | Oesterheld et al. | D13/32 |
| 3,337,992 | 8/1967 | Tolson | 49/29 |
| 3,955,405 | 5/1976 | Couture | 340/659 |
| 4,023,153 | 5/1977 | Adachi | 340/251 |
| 4,191,947 | 3/1980 | Bouchard et al. | 340/531 |
| 4,359,764 | 11/1982 | Block | 361/119 |
| 4,417,235 | 11/1983 | Del Grande | 340/531 |
| 4,602,357 | 7/1986 | Yang et al. | 367/93 |
| 4,612,535 | 9/1986 | Sequin et al. | 390/539 |
| 4,634,814 | 1/1987 | Pommer, II | 379/377 |
| 4,794,485 | 12/1988 | Bennett | 361/127 |
| 4,876,626 | 10/1989 | Kaczmarek | 361/119 |
| 4,912,590 | 3/1990 | Misencik et al. | 361/56 |
| 5,177,461 | 1/1993 | Budzyna et al. | 340/331 |

OTHER PUBLICATIONS

Powerlink AS Remote Power Switching System, QO(B)–AS Circuit Breakers, Apr. 1993.
Powerlink AS Remote Power Switching System, EHB–AS Circuit Breakers, Apr. 1993.

Primary Examiner—Jeffrey A. Gaffin
Assistant Examiner—Stephen Jackson
Attorney, Agent, or Firm—Marger, Johnson, et al.

[57] ABSTRACT

A surge suppression system includes a surge suppression circuit having multiple surge suppression elements each capable of activating during a voltage transient or other power surge condition. A multi-level monitoring circuit surveys the percentage of operational surge suppression elements. The monitoring circuit generates a low priority signal when a small percentage of the surge suppression elements are disabled. The monitoring circuit generates a high priority signal when a second higher percentage of the surge suppressor elements are disabled. In another aspect of the invention, each fuse is formed as a trace on a printed circuit board.

20 Claims, 2 Drawing Sheets

POWER SURGE SUPRESSION SYSTEM WITH MULTI-LEVEL STATUS ANNUNCIATION CIRCUITRY

BACKGROUND OF THE INVENTION

This invention relates generally to A.C. surge suppressors and more particularly to fuses and annunciating circuitry used in a surge suppressor system.

Transient Voltage Surge Suppression (TVSS) devices use Metal Oxide Varistors (MOVs). A MOV is fused between an A.C. power line and a neutral line. The MOV becomes conductive during a voltage transient. In the conductive state, the MOV temporarily discharges the voltage transient to the neutral line. The MOV continues to conduct until a fuse connected in series with the MOV blows.

Multiple MOVs are connected in parallel to share transient voltage spikes. If a voltage spike or power surge is in excess of the combined energy handling capability of the multiple MOVs, one or more of the fused MOVs blow. However, a majority of the MOVs may be unaffected by the power surge condition and continue to provide surge suppression protection for electrical equipment connected to the A.C. power line.

Monitoring systems identify voltage spikes or power surges events on a power line. Other monitoring systems determine whether a protection circuit is in an operational condition. However, monitoring systems do not identify the level of surge suppression protection existing in the surge suppression system. As described above, a surge suppression system may remain operational when only a small percentage of the MOVs may be disabled after a power surge. Alternatively, the surge suppression system may be severely compromised if a majority of the MOVs are disabled. Slightly disabled surge suppression systems do not require immediate replacement or maintenance. Alternatively, severely disabled surge suppression systems require immediate attention. Thus, maintenance personnel must continuously inspect surge suppression systems to determine current operational status. However, constant manual inspection is not possible especially when surge suppression systems are located in remote locations.

Each fused MOV in the surge suppression system must be able to withstand a relatively large power surge condition. Thus, large individual bus wires are used as fuses to sense and, in turn, blow during a voltage transient. The bus wires must be individually cut and soldered to each MOV. Many surge suppression systems use a large number of MOVs. Cutting and soldering a large number of individual bus wires is labor intensive, increasing the manufacturing costs for each suppression system.

Individual bus wires also utilize a substantial amount of space on a circuit board limiting the number of MOVs in the suppression system.

Limiting the number of MOVs reduces the amount of transient protection provided by the suppression system while decreasing system operating life.

Accordingly, a need remains for automatically interrogating the operational status of surge suppression systems while at the same time reducing manufacturing costs.

SUMMARY OF THE INVENTION

A surge suppression system includes a surge suppression circuit having multiple surge suppression elements each capable of activating during a voltage transient or other power surge condition. A multi-level monitoring circuit is coupled to the surge suppression circuit and determines what percentage of the surge suppression elements are operational.

The monitoring circuit generates a low priority signal when a small percentage of the surge suppression elements are blown. The monitoring circuit generates a high priority signal when a second higher percentage of the surge suppressor elements are blown. The dual-level monitoring system constantly tracks the level of surge suppression protection available in the surge suppressor system. If the low priority signal is activated, personnel are notified that, while portions of the surge suppression system are damaged, immediate replacement is not required. Activation of the high priority signal notifies personnel that the surge suppression system requires immediate attention.

The monitoring circuit comprises two or more voltage comparators each coupled to the surge suppression elements. A first voltage comparator is coupled to a low priority voltage reference and a second voltage comparator is coupled to a high priority voltage reference. The voltage references are variable changing the percentage of blown surge suppression elements necessary to activate the low and high priority signals.

The multiple surge suppressor elements each comprise a fuse coupled in series with either a MOV or a Silicon Avalanche Diode (SAD). In another aspect of the invention, instead of using bus wires, each fuse is formed as a trace on a printed circuit board. The fuses simplify assembly of the surge suppression system and allow a larger number of surge suppressor elements to be placed on one circuit board. Thus, the circuit is less expensive to manufacture and provides more surge suppression protection than currently possible for similar systems.

The foregoing and other objects, features and advantages of the invention will become more readily apparent from the following detailed description of a preferred embodiment of the invention which proceeds with reference to the accompanying drawings.

DETAILED DESCRIPTION

Figure 1:
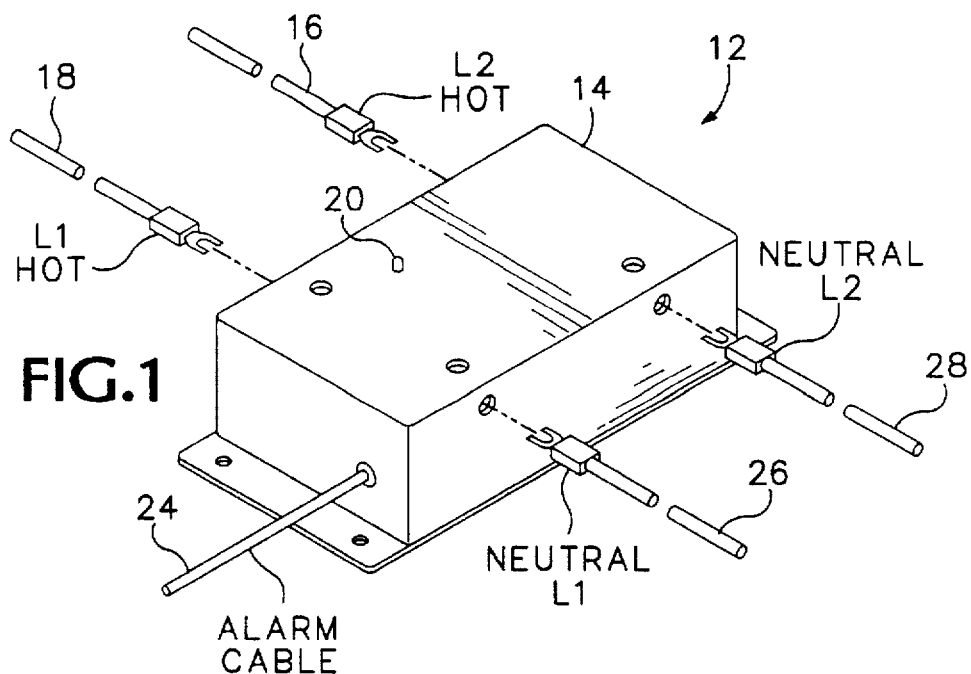
FIG. 1 is a perspective view of a surge suppression system according to the invention.
Figure 3:
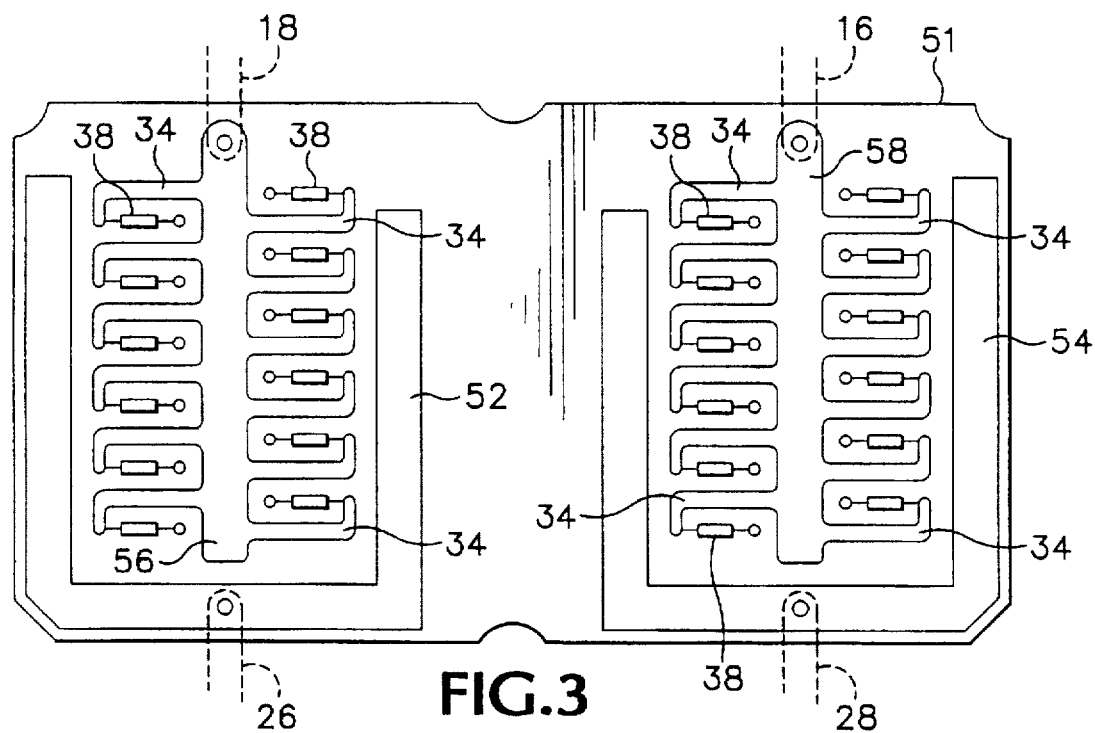
FIG. 3 is a top view of a surge suppressor circuit board having traced A.C. fuses according to another aspect of the invention.
Figure 4:
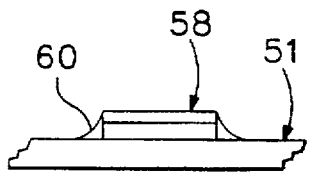
FIG. 4 is a cross-sectional view of a power bus for the circuit board shown in FIG. 3.

Referring to FIG. 1, a power surge suppression system 12 includes a box 14 containing a printed circuit board 51 (FIG. 3). A first power supply line 16 and an associated neutral line 28 are connected to the circuit board 51. A second power supply line 18 and an associated neutral line 26 can optionally be connected to the circuit board 51. A light-emitting diode 20 is used for visually identifying a high priority maintenance condition. An alarm cable 24 may be connected to the circuit board 51 to activate multiple annunciators (FIG. 2).

The surge suppression system 12 provides redundant surge suppression protection for electrical devices connected to either power line 16 or power line 18. The system includes multiple surge suppression elements that individually, or in combination, discharge voltage transients to the neutral lines. The multiple surge suppression elements allow the system to operate for a number of power surge events.

Figure 2:
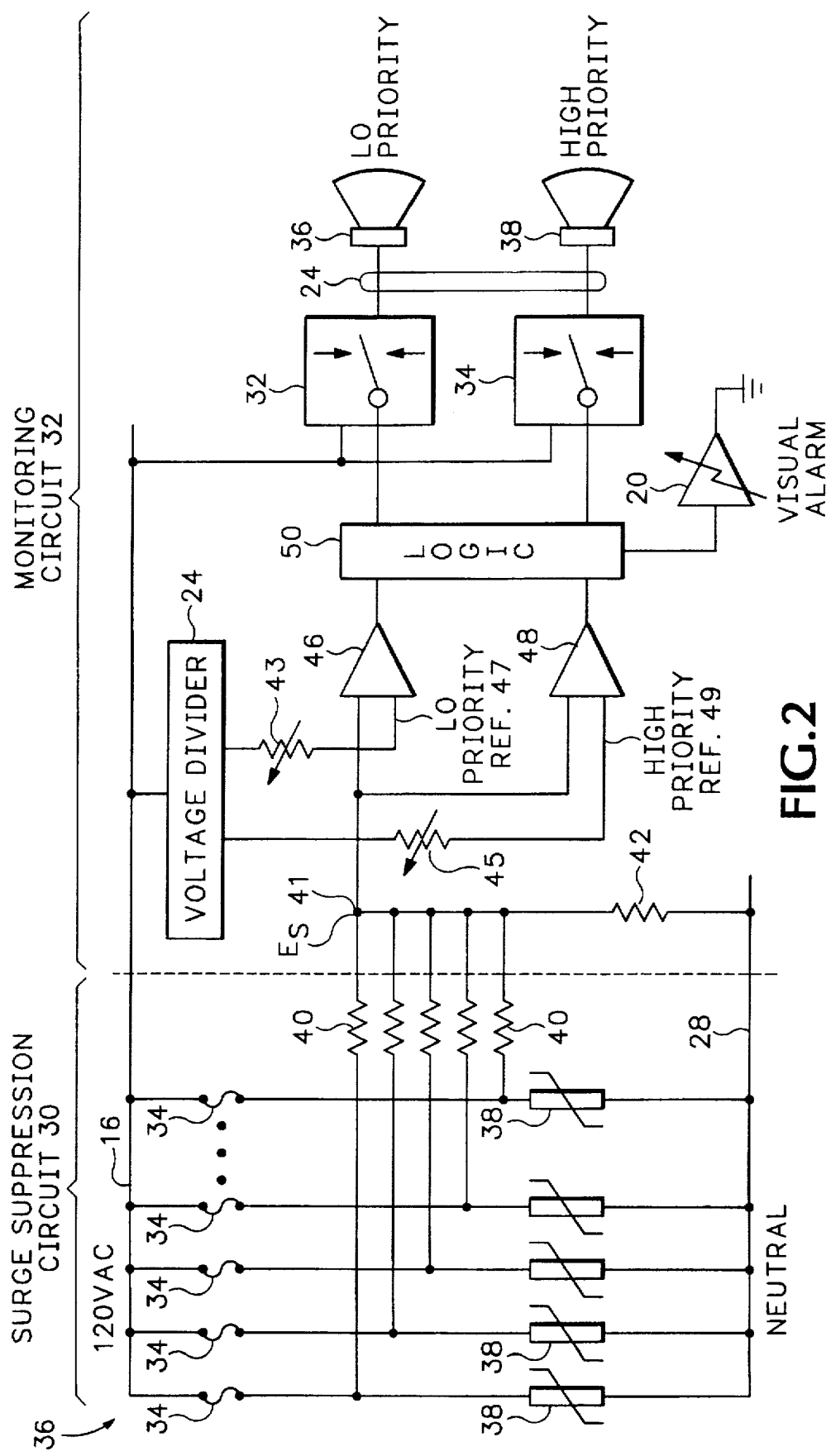
FIG. 2 is a circuit diagram for the surge suppression system shown in FIG. 1.

Referring to FIG. 2, a surge suppression circuit 30 is coupled between the power supply line 16 and the neutral line 28. The surge suppression circuit 30 includes multiple surge suppression elements 36 each capable of activating during a power surge condition. A multi-level monitoring circuit 32 is coupled to the surge suppression circuit 30 and identifies what percentage of the surge suppression elements 36 are functional.

Each one of the surge suppression elements 36 includes an A.C. fuse 34 coupled in series with an associated MOV or SAD 38. Each fuse 34 comprises a trace formed on the printed circuit board 51 (FIG. 3). Each fuse 34 has a first end coupled to the power supply line 16 and a second end coupled to the MOV 38. Multiple resistors 40 are each coupled at a first end between the fuse 34 and the associated MOV 38 for one of the surge suppression elements 36. A second end of each resistor 40 is coupled to an input node 41 of the monitoring circuit 32. The resistors 40 each contribute to a monitoring voltage Es at the input node 41. A resistor 42 is coupled between node 41 and neutral 28. Each resistor 40 has the same value providing equally gradated changes to the voltage Es.

The monitoring circuit 32 comprises a first voltage comparator 46 and a second voltage comparator 48. Each voltage comparator includes a first input coupled to node 41. A second input for comparator 46 is coupled to a LO priority voltage reference 47 generated from a voltage divider 24. A second input on voltage comparator 48 is coupled to a HIGH priority voltage reference 49 generated from the voltage divider 24. A variable resistor 43 varies the LO priority voltage reference and a variable resistor 45 varies the HIGH priority voltage reference 49.

A logic circuit 50 receives the outputs of voltage comparators 46 and 48. The logic circuit 50 generates signals that activate a visual alarm (LED) 20 and two annunciation switches (relays) 32 and 34. The switch 32 is coupled through cable 24 to a LO priority annunciator 36 and the switch 34 is coupled through cable 24 to a HIGH priority annunciator 38. The necessary components used in the voltage divider 24 and the logic circuit 50 are known to those skilled in the art and are, therefore, not described in detail.

Each one of the multiple surge suppression elements 36 contribute a portion of the voltage at node 41 through resistors 40. The voltage level of Es is used to determine what percentage of the surge suppression elements 36 are in an operational condition. When 120 VAC is applied to line 16 and each one of the surge suppressor elements 36 is enabled, input node 41 has a voltage Es. If the combined energy handling capacity of the MOVs 38 is exceeded during a voltage transient, one or more of the MOVs 38 begin to conduct and the associated fuse 34 blows. When a fuse 34 blows, no current flows through the associated resistor 40 reducing the total voltage Es at node 41.

Both comparator 46 and 48 monitor Es. If enough fuses blow, Es drops below the LO priority reference voltage 47. Comparator 46 generates an output signal that activates relay 32 which turns on LO priority annunciator 36. In one embodiment, the LO priority reference voltage 47 is selected to equal the voltage of Es when approximately 10% of the surge suppression elements 36 are disabled.

The low priority annunciator 36 notifies personnel that a relatively small number of surge suppression elements are disabled. Activation of the low priority signal, in the absence of activation of the HIGH priority annunciator 38, also provides notification that a relatively large number of surge suppression elements 36 remain enabled. Thus, the LO priority annunciator indicates a partially disabled surge suppression system that does not require immediate maintenance.

If additional surge suppression elements blow during subsequent power surges, Es drops below the HIGH priority reference voltage 49. Comparator 48 generates an output signal that activates relay 34 which turns on HIGH priority annunciator 38. The HIGH priority annunciator 38 provides notification that a substantial number of surge suppression elements 36 are disabled. Thus, personnel are notified that the surge suppression system 12 should be serviced immediately. In one embodiment, the HIGH priority reference voltage 49 is selected to equal the voltage level of Es when approximately 50% of the surge suppression elements 36 are disabled.

The LO priority reference voltage 47 is varied with variable resistor 43 and the HIGH priority reference voltage 49 is varied with variable resistor 45. Thus, the percentage of disabled surge suppression elements 36 required to activate the LO priority annunciator 36 and the HIGH priority annunciator 38 can be varied for different applications. The visual alarm 20 is activated during a high priority annunciation condition when, for example, 50% or more of the surge suppression elements are blown.

More than two levels of annunciation can be provided. For example, more than two voltage comparators can be connected to the surge suppression circuit 30. The voltage comparators are then provided with smaller differences between voltage reference values by voltage divider 24. Additional voltage comparators provide more precise annunciation for identifying the percentage of operational surge suppression elements 36. It is also within the scope of this invention to connect the logic circuit 50 into a microprocessor coupled into a display (not shown). The microprocessor generates an alphanumeric readout showing the percentage of enabled or disabled surge suppression elements.

The monitoring circuit 32 can be connected to surge suppression elements on more than one power line. For example, a first set of surge suppression elements 36 are coupled to power line 16 comprising a first power phase and a second set of surge suppression elements 36 are connected to the second power line 18 comprising a second phase of an A.C. power system. Thus, the monitoring circuit 32 can interrogate surge suppression status for two power phases at the same time.

Referring to FIG. 3, the circuit board 51 contains the circuitry shown in FIG. 2. A power bus 58 is traced on the printed circuit board 51 and connected by fuses 34 to individual MOVs 38. The fuses 34 comprise individual fingers traced in the printed circuit board and extend perpendicularly from the sides of the power bus 58. The fingers 34 are each sized to blow apart if the associated MOV fails during an A.C. power surge condition. Each finger 34 is approximately 0.125/inches wide and 0.625 inches long. The traces on the printed circuit board are about 0.0028 inches thick. For a fuse 34 that is 0.125 inches wide, the cross-sectional area is $(0.0028)(0.125) = 0.00035$ inches$^2$.

Referring to FIG. 3, the power bus 58 is about 0.250 inches wide and also 0.0028 inches thick. The cross-sectional area is therefore, $(0.0028)(0.250) = 0.0007$ inches$^2$. The power bus includes a copper overlay 60 which is 0.032 inches thick. The cross-sectional area of the overlay is: $(0.250)(0.032)=0.008$ inches$^2$. Thus, the total cross-sectional area for the overlay is: $0.007+0.008=0.0087$ inches$^2$. The ration of power bus to fuse cross-sectional area is: $0.0087/0.00035=24.857$. The power bus 58 has a larger cross-sectional area to ensure that the current density is highest in the fuse trace 34. This ensures that the fuse 34 will open (blow instead of the bus 34).

The power bus 58 is connected to the power line 16 and a second power bus 56 is connected to the power line 18 for the second power phase. The first power bus 58 and the second power bus 56 are aligned in a parallel arrangement on opposite ends of the circuit board 51. A first neutral trace 54 is connected to neutral line 28 and extends in a "U" shape around the first power bus 54. A second neutral trace 52 is connected to the neutral line 26 and extends in a "U" shape around the second power bus 56.

The "U" shaped neutral traces 52 and 54 provide a uniform distance from each fuse 34. Thus, the MOVs 38 provide uniform surge suppression redundancy for the surge suppression system. Because the A.C. fuses 34 are traced on the printed circuit board 51, individual discrete bus wires do not have to be cut and then soldered between the power bus 58 and the MOVs. Thus, the surge suppression system 12 is easier to assemble and less expensive to manufacture. The fused traces also allow more surge suppression elements to be used on the printed circuit board. Thus, more surge suppression protection can be provided in the surge suppression system 12.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A surge suppression system, comprising:

a surge suppression circuit coupled between a power supply line and a neutral line, the surge suppression circuit including multiple surge suppression elements each capable of activating during a power surge condition; and a multi-level monitoring circuit coupled to the surge suppression circuit, the monitoring circuit identifying multiple percentages of the surge suppression elements maintaining a functional condition.

2. A system according to claim 1 wherein the monitoring circuit generates a first low priority signal when more than 10% of the surge suppression elements are blown and a second high priority signal when more than 50% or more of the surge suppressor elements are blown.

3. A system according to claim 1 wherein the power line includes a first phase coupled to a first set of the multiple surge suppression elements and a second phase coupled to a second set of the multiple surge suppression elements.

4. A system according to claim 1 wherein the monitoring circuit comprises multiple voltage comparators each including a first input coupled to each one of the multiple surge suppression elements, a second input coupled to different preselected voltage references and an output.

5. A system according to claim 4 including multiple annunciation switches each coupled to the output for one of the voltage comparators.

6. A system according to claim 5 including a logic circuit coupled between the annunciation switches and the voltage comparators and a visual indicator coupled to the logic circuit.

7. A system according to claim 1 wherein each one of the surge suppression elements comprise a high voltage A.C. fuse coupled in series with a voltage controlled impedance device.

8. A system according to claim 7 wherein each A.C. fuse comprises a trace formed on a printed circuit board, each trace having a first end coupled to the power supply line and a second end coupled to the voltage controlled impedance device.

9. A system according to claim 7 including multiple resistors each coupled at a first end between the fuse and the voltage controlled impedance device for one of the surge suppression elements and coupled at a second end to an input node for the monitoring circuit, the multiple resistors generating an input voltage at the input node.

10. A system according to claim 9 wherein each resistor comprises the same resistance value.

11. A circuit board for a high voltage A.C. surge suppression system, comprising:

a power bus traced on the printed circuit board;

multiple surge suppression devices each mounted on the printed circuit board; and multiple A.C. fuses each formed from traces etched in the printed circuit board and extending from the power bus in series with an associated one of the multiple surge suppression devices, the fuses each sized to open when the associated surge suppression devices fail or in an excess A.C. power surge condition while allowing other fuses and associated surge suppression devices to continue to provide surge suppression protection.

12. A circuit board for a high voltage A.C. surge suppression system, comprising:

a power bus traced on the printed circuit board;

multiple surge suppression devices each mounted on the printed circuit board;

multiple A.C. fuses traced in the printed circuit board and extending from the power bus to an associated one of the multiple surge suppression devices, the fuses each sized to open when the associated surge suppression devices fail or in an excess A.C. power surge condition; and a multi-level monitoring circuit coupled to the surge suppression devices, the monitoring circuit identifying different percentages of the surge suppression devices maintaining a functional condition.

13. A circuit board for a high voltage A.C. surge suppression system, comprising:

a power bus traced on the printed circuit board;

multiple surge suppression devices each mounted on the printed circuit board; and multiple A.C. fuses traced in the printed circuit board and extending from the power bus to an associated one of the multiple surge suppression devices, the fuses each sized to open when the associated surge suppression devices fail or in an excess A.C. power surge condition, each fuse having a cross-sectional area of about 0.00035 square inches and the power bus having a cross-sectional area of about 0.0087 square inches.

14. A circuit board for a high voltage A.C. surge suppression system, comprising:

a power bus traced on the printed circuit board;

multiple surge suppression devices each mounted on the printed circuit board; and multiple A.C. fuses traced in the printed circuit board and extending from the power bus to an associated one of the multiple surge suppression devices, the fuses each sized to open when the associated surge suppression devices fail or in an excess A.C. power surge condition and the power bus including a given trace thickness and a copper overlay extending along the entire power bus.

15. A circuit board for a high voltage A.C. surge suppression system, comprising:

a power bus traced on the printed circuit board;

multiple surge suppression devices each mounted on the printed circuit board; and multiple A.C. fuses traced in the printed circuit board and extending from the power bus to an associated one of the multiple surge suppression devices, the fuses each sized to open when the associated surge suppression devices fail or in an excess A.C. power surge condition and the power bus comprising a first power bus coupled to a first phase of an A.C. power line and including a second power bus coupled to a second phase of the A.C. power line.

16. A circuit board according to claim 15 wherein the first and second power bus are aligned in a parallel arrangement on opposite ends of the circuit board and including a first neutral trace extending in a "U" shape around the first power bus and coupled to a first neutral line and a second neutral trace extending in a "U" shape around the second power bus and coupled to a second neutral line.

17. A circuit board for a high voltage A.C. surge suppression system, comprising:

a power bus traced on the printed circuit board;

multiple surge suppression devices each mounted on the printed circuit board;

multiple A.C. fuses traced in the printed circuit board and extending from the power bus to an associated one of the multiple surge suppression devices, the fuses each sized to open when the associated surge suppression devices fail or in an excess A.C. power surge condition; and a neutral trace, the multiple fuses and associated surge suppression devices coupled in parallel between the power bus and the neutral trace.

18. A circuit according to claim 17 wherein each one of the multiple fuses is about the same width and same length.

19. A method for annunciating operational status of multiple surge suppression elements connected to a high voltage A.C. power line, comprising:

generating a status signal from each one of the multiple surge suppression elements for distinguishing between an operational condition and a disabled condition;

monitoring the status signal for each one of the multiple surge suppression elements;

generating a first priority annunciation signal when a first percentage of the surge suppression elements are in the disabled condition; and generating a second priority annunciation signal when a second percentage of the surge suppression elements are in the disabled condition.

20. A method according to claim 19 wherein each one of the multiple surge suppression elements includes a fuse formed in a trace on a printed circuit board, each one of the surge suppression elements placed in a disabled condition when the fuse blows.

* * * * *

UNITED STATES PATENT AND TRADEMARK OFFICE
CERTIFICATE OF CORRECTION

PATENT NO. : 5,790,360
DATED : Aug. 4, 1998
INVENTOR(S) : Ryan

It is certified that error appears in the above-indentified patent and that said Letters Patent is hereby corrected as shown below:

In the title: "SUPRESSION" should read --SUPPRESSION--.

Signed and Sealed this

Seventh Day of September, 1999

Attest:

Q. TODD DICKINSON

*Attesting Officer*        *Acting Commissioner of Patents and Trademarks*